UNITED STATES PATENT OFFICE.

CHARLES A. H. DE SAULLES, OF NEW YORK, N. Y.

PROCESS OF ROASTING ZINC-BLENDE.

1,183,172.

Specification of Letters Patent. Patented May 16, 1916.

No Drawing. Application filed October 17, 1914. Serial No. 867,947.

*To all whom it may concern:*

Be it known that I, CHARLES A. H. DE SAULLES, a citizen of the United States, and resident of the borough of Manhattan, city, county, and State of New York, have invented certain new and useful Improvements in Processes of Roasting Zinc-Blende; and I do hereby declare the following to be a full, clear, and exact description of the invention, such as will enable others skilled in the art to which it appertains to make and use the same.

In the roasting of zinc blende as a preliminary operation to the recovery of zinc in the form of spelter in the usual retort furnace, there remain in the roasted ore constituents which have a prejudicial effect upon the retort process. These constituents, not reduced in the customary roasting operation, have, in part, the effect of producing a slag of such relatively high basicity as to corrode the walls and bottom of the retort; in part, also, they have as a result the production of a large quantity of gas which in making its exit from the retort unduly speeds the zinc vapors as they pass through the condenser, so that some of the zinc vapor is carried out of the condenser and is thus lost in so far as the production of spelter is concerned; and, finally, some of the ingredients left in the roasted charge are of such a character as to give up sulfur contained in them to the zinc vapors, resulting in the formation of zinc sulfid, which is likewise lost in so far as the production of spelter is concerned. So also, in the practical operation of the spelter retort when applied to the production of spelter from roasted blende, a considerable portion of the time required for the complete treatment of the charge is absorbed in the preliminary reduction in the retort of these prejudicial ingredients. In the endeavor to overcome these disadvantages, I have ascertained that they can be largely minimized by adding to the charge, in the final stage of the roasting operation, a quantity of carbon (for instance, anthracite coal) and by regulating the combustion of the carbon for the purpose not only of obtaining a reducing effect upon the deleterious ingredients in question, but also of realizing a temperature high enough to effect the additional advantage of dissociation of such deleterious ingredients by heat, without, however, volatilizing any of the zinc or other metals. The high temperature due to the combustion of the carbon is likewise assisted by the exothermic character of the resulting reactions, to the corresponding benefit of the reducing and dissociation effects desired.

In the practical application of my invention, when the roasting operation is carried on, for instance, in a roaster of the well known Matthiessen and Hegeler type, or the like, I add the carbon upon the last or next to the last hearth of the series and in such manner as to maintain as nearly equal a distribution in carbon as is possible, throughout the charge. I then regulate the air blast to such a degree as to initiate the reduction or dissociation, as the case may be, if the deleterious ingredients, the temperature thus realized being correspondingly increased by the exothermic character of the reactions themselves, as above indicated. The effect of this procedure is manifold. In the first place, the zinc sulfate present in the charge will be dissociated, its sulfur ingredient passing off and leaving zinc oxid. Secondly, the sulfates of lead, barium and calcium present are reduced to sulfids of lead, barium, and calcium, so that the subsequent spelter retort process is relieved of the burden of reducing them, and so that there is a corresponding lesser production of gases in the spelter retort. The sulfate of magnesium present is reduced to magnesium oxid, which, in sharp contrast to the trouble usually attendant in the retort process upon the presence of magnesium therein is harmless to the retort and is even beneficial in that it tends to stiffen the slag therein. Furthermore, the $Fe_2O_3$ present is reduced in part to metallic iron in part to $Fe_3O$ and in part to $FeO$, in which form they are of less deleterious effect upon the retorts. It is also evident, of course, that the aggregate amount of sulfur present in the charge is likewise diminished. The net result of the procedure described is to relieve the retort process of a considerable proportion of the burden usually imposed upon it. Such reduction and dissociation as take place in the roasting operation, as practised in accordance with my invention, is found to result in so relieving the spelter retort operation that the zinc vapor begins to distil from the retorts from one to two hours earlier than in the usual practice, and, without lengthening the period of operation in the retorts, and, in fact, even shortening that operation, a longer period is nevertheless obtained for the zinc distillation *per se*, inasmuch as the distillation begins earlier. So also, the loss of sulfur which, in the usual operation is attendant upon the production of an excessive amount of gas, which tends to push the zinc vapors through the condenser, is correspondingly diminished.

In the ordinary practice, the magnesium sulfate present in the charge is reduced in the retorts to magnesium sulfid, and the latter in being further changed to magnesium oxid gives up its sulfur to the zinc in the form of zinc sulfid, thus increasing the zinc loss. In the practice of my invention, this source of zinc loss is entirely removed and the magnesium oxid is even made available to the advantage of the operation in stiffening the slag and counteracting the formation of fusible slags, as specified. Finally, the highly basic $Fe_2O_3$ usually present is, by reduction outside of the retorts, in accordance with my invention, made harmless by conversion, as described, into metallic iron and into oxids of lower basicity.

In actual practice, my process has resulted in raising the percentage of zinc recovered from roasted zinc blende of inferior quality, from an 80 per cent. recovery under the customary practice, to 88 per cent. recovery, and has diminished the retort loss from 1.6 retorts per ton of ore smelted to 1 retort. I may say, further, that many of the advantages due to the reduction and dissociation of the deleterious ingredients of roasted zinc blende as hereinbefore described, are likewise realizable not only in the subsequent treatment of the roasted product in the usual retort process, but also in the electric zinc furnace process, wherein the presence of such ingredients is likewise to be avoided.

I have found that the reduction and dissociation of the compounds, in accordance with my invention, can be effected, at the high temperatures required, without causing any noticeable loss of zinc or other metals; that is to say, the reduction and dissociation in the final stage of the roasting operation requiring a temperature which, although in excess of the temperatures employed in ordinary roasting are nevertheless below the temperatures which would result in any material loss of zinc or other metals.

In carrying out the invention as hereinbefore described, I add carbon, preferably in the form of fine anthracite coal, at the latter part of the roasting operation equal to about eight per cent. in weight of the charge of the zinc ore and so regulating the air supply, by any appropriate means for controlling the air inlets, that the temperature due to the combustion of the added carbon shall not exceed 1000 degrees C., and, preferably, attains a maximum of 880 degrees C., the latter precaution being necessary to avoid volatilizing any of the zinc or other metals in the preliminary roasting operation.

When the process is applied as a preliminary to the electric zinc furnace process, preferably from fifteen to twenty per cent. of carbon in the form of fine coal is added to the roasting charge toward the end of the roasting operation which, in addition to the advantages hereinbefore indicated, has the desirable and necessary effect of also preheating the charge before it is delivered to the electric furnace.

What I claim is:—

The method of treating zinc blende for recovering metallic zinc, which comprises roasting the blende, adding carbon to the roasting charge at the latter end of the roasting operation and regulating the air admission so as to produce a temperature not exceeding 1,000° C. and thereby obtaining a reduction and dissociation of the sulfates present without volatilizing any of the metals, and finally treating the resultant roast in a suitable furnace to reduce the zinc to a metallic state.

In testimony whereof I affix my signature, in presence of two witnesses.

CHARLES A. H. DE SAULLES.

Witnesses:
H. A. PROSSER,
M. A. GATELY.